(12) United States Patent
Green et al.

(10) Patent No.: US 11,372,227 B2
(45) Date of Patent: Jun. 28, 2022

(54) MICROSECTION SAMPLE STABILIZER (71) Applicant: Raytheon Company, Waltham, MA (US)

(72) Inventors: Darrin Green, McKinney, TX (US); Stephen T. Fasolino, McKinney, TX (US); Joseph F. Colangelo, Carrollton, TX (US)

(73) Assignee: Raytheon Company, Waltham, MA (US)

( * ) Notice: Subject to any disclaimer, the term of this patent is extended or adjusted under 35 U.S.C. 154(b) by 615 days.

(21) Appl. No.: 16/280,943

(22) Filed: Feb. 20, 2019

(65) Prior Publication Data

US 2020/0264421 A1 Aug. 20, 2020

(51) Int. Cl.
*G02B 21/26* (2006.01)
*G02B 21/32* (2006.01)
*G02B 21/24* (2006.01)
*G02B 21/34* (2006.01)

(52) U.S. Cl.
CPC ............ *G02B 21/26* (2013.01); *G02B 21/32* (2013.01); *G02B 21/241* (2013.01); *G02B 21/34* (2013.01)

(58) Field of Classification Search
CPC ...... G02B 21/26; G02B 21/32; G02B 21/241; G02B 21/34
See application file for complete search history.

(56) References Cited

U.S. PATENT DOCUMENTS

| 3,307,035 A | 2/1967 | Grasenick et al. |
| 4,635,887 A | 1/1987 | Hall et al. |
| 4,785,177 A | 11/1988 | Besocke |
| 5,033,834 A | 7/1991 | Corder et al. |
| 5,041,783 A | 8/1991 | Ohta et al. |
| 5,416,414 A | 5/1995 | Mansfield et al. |

(Continued)

FOREIGN PATENT DOCUMENTS

| DE | 642659 C | 3/1937 | |
| DE | 202010017304 U1 * | 11/2011 | ............. G02B 21/34 |

(Continued)

OTHER PUBLICATIONS

Invitation to Pay Additional Fees for International Application No. PCT/US2019/068095 dated Apr. 6, 2020, 14 pages.

(Continued)

*Primary Examiner* — Darryl J Collins
*Assistant Examiner* — Tamara Y. Washington (57) ABSTRACT

A microsection sample stabilizer for aligning and stabilizing a microsection sample for microscopic inspection includes a frame including a base and at least one leveling portion supported by the base. The at least one leveling portion can define a viewing window for a microscope. The microsection sample stabilizer includes an interior region within the frame, and at least one compliant device operable within the interior region of the frame and operable to be supported by the base. The compliant device receives and supports the microsection sample, and biases the microsection sample against the at least one leveling portion of the frame to stabilize the microsection sample, such that an examination plane surface of the microsection sample is aligned and viewable through the viewing window by the microscope.

15 Claims, 5 Drawing Sheets

(56) References Cited

U.S. PATENT DOCUMENTS

| | | | |
|---|---|---|---|
| 5,479,013 | A | 12/1995 | Forster et al. |
| 5,726,454 | A | 3/1998 | Chun |
| 5,812,310 | A | 9/1998 | Stewart et al. |
| 6,172,349 | B1 | 1/2001 | Katz et al. |
| 6,369,940 | B1 | 4/2002 | Nishida et al. |
| 6,414,322 | B1 | 7/2002 | Carroll |
| 2017/0146783 | A1 | 5/2017 | Lundin |

FOREIGN PATENT DOCUMENTS

| | | | | |
|---|---|---|---|---|
| DE | 202010017304 | U1 | | 11/2011 |
| DE | 102012205170 | A1 | | 10/2013 |
| DE | 102016115090 | A1 * | 2/2018 | ....... G01N 23/20025 |
| DE | 102016115090 | A1 | | 2/2018 |
| EP | 0029238 | A1 | | 5/1981 |
| JP | S53-52139 | A | | 5/1978 |

OTHER PUBLICATIONS

Aliexpress, Metallurgical microscope sample flattener flatten instrument Microscope Accessories , https://www.aliexpress.com/item/Metallurgical-microscope-sample-flattener-flatten-instrument-Microscope-Accessories/32640609442.html, retrieved on Feb. 20, 2019, 2 pages, retrieved from www.aliexpress.com/.

* cited by examiner

MICROSECTION SAMPLE STABILIZER

BACKGROUND

Various materials and products (i.e., "samples") may require microscopic inspection for failure analysis. To achieve this, the material or product, or a portion thereof, can be encased in an epoxy or other suitable medium and then a portion sliced or sectioned in order to provide a sample for viewing under the microscope. This is often referred to as microsectioning. One example type of products that are often microsectioned and analyzed are electronics components, such as an electronics connector (e.g., a hermetic style connector) that have been encased and then microsectioned to generate a microsection sample. More specifically, microsectioning is a process of grinding or polishing a flat surface (i.e., examination plane surface) of a section of the epoxy-encased material or product to be analyzed, so that the polished, flat surface can be viewed and inspected on a microscopic level to examine portions of the sectioned material or product. Many materials and products can be sectioned in this manner for inspection. For instance, other examples include circuit board components, solder interfaces, connector pins, connector parts, and still others.

To achieve an effective, reliable analysis of the microsection sample under the microscope, it is often desirable to precisely align and stabilize the microsectioned sample with respect to the microscope during such microscopic inspection and analysis. If the microsectioned sample is not properly aligned and stabilized, subsequent inspection and analysis can be burdensome and problematic. It is further desirable to inspect a "leveled surface" of the microsection sample, meaning that it is desirable to locate the examination surface on a plane that is level (and aligned) relative to the microscope and its stage that supports the microsection sample, otherwise the focal point of the microscope must be constantly adjusted, and/or the position of the microsection sample must be constantly altered (e.g., via the movable stage of the microscope) while viewing the different surface areas of the examination surface of the microsection sample. Inconsistent visual and dimensional readings of the microsection sample can result if the examination plane surface is not leveled and stabilized.

BRIEF DESCRIPTION OF THE DRAWINGS

Features and advantages of the invention will be apparent from the detailed description which follows, taken in conjunction with the accompanying drawings; which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a microsection sample stabilizer for use with a microscope comprising a frame comprising a base and at least one leveling portion supported by the base. The at least one leveling portion can define a viewing window. The microsection sample stabilizer can comprise an interior region within the frame, defined by the base and the at least one leveling portion. The viewing window can be in open communication with the interior region. The microsection sample stabilizer can comprise at least one compliant device operable within the interior region of the frame and operable to be supported by the base. The compliant device can be operable to receive and support a microsection sample, and the compliant device can be operable to bias a microsection sample against the at least one leveling portion of the frame to stabilize and align the microsection sample, such that an examination plane surface of the microsection sample is viewable through the viewing window.

In one example, the at least one leveling portion comprises a sample interface surface operable to receive and interface with an examination plane surface of the microsection sample, and at least one intermediate frame support extending from the base, and supporting the at least one leveling portion.

In one example, the compliant device comprises a compression spring, which can comprise at least one of a coil spring, a torsional spring, or a leaf spring, and/or which can comprise an elastic body formed from at least one of rubber, elastomer, polyester foam, or polyurethane foam.

The present disclosure sets forth a system for facilitating microscopic inspection of a microsection sample. The system can comprise a microsection sample having an examination plane surface, and a microsection sample stabilizer comprising: a frame comprising a base and at least one leveling portion supported by the base (the at least one leveling portion defining a viewing window); an interior region within the frame, defined by the base and the at least one leveling portion (the viewing window in open communication with the interior region); and at least one compliant device situated within the interior region of the frame and supported by the base. The compliant device can bias the microsection sample against the at least one leveling portion of the frame, such that the examination plane surface is interfaced to the at least one leveling portion to stabilize and align the microsection sample, and such that the examination plane surface of the microsection sample is viewable through the viewing window for viewing by a microscope.

In one example, the examination plane surface defines a first plane, and the at least one leveling portion defines a second plane substantially parallel to the first plane.

In one example, the examination plane surface defines a first plane, and the base comprises a lower surface that defines a second plane substantially parallel to the first plane.

In one example, the system comprises a stabilization panel situated between the compliant device and a lower surface of the microsection sample, such that the stabilization panel is biased to the lower surface, and such that a position of the stabilization panel conforms to a shape of the lower surface of the microsection sample to align and stabilize the examination plane surface against the at least one leveling portion.

The present disclosure sets forth a method for stabilizing and aligning a microsection sample for viewing with a microscope comprising: (1) obtaining a microsection sample having an examination plane surface, and (2) obtaining a microsection sample stabilizer comprising: (a) a frame comprising a base and at least one leveling portion supported by the base (the at least one leveling portion defining a viewing window); (b) an interior region within the frame, defined by the base and the at least one leveling portion (the viewing window in open communication with the interior region); and (c) at least one compliant device situated within the interior region of the frame and supported by the base; (3) positioning the microsection sample within the interior region of the frame, such that the microsection sample is situated between the compliant device and the at least one leveling portion; and (4) causing the compliant device to bias the examination plane surface of the microsection sample against the at least one leveling portion, thereby stabilizing and aligning the microsection sample with the microsection sample stabilizer.

Figure 1:
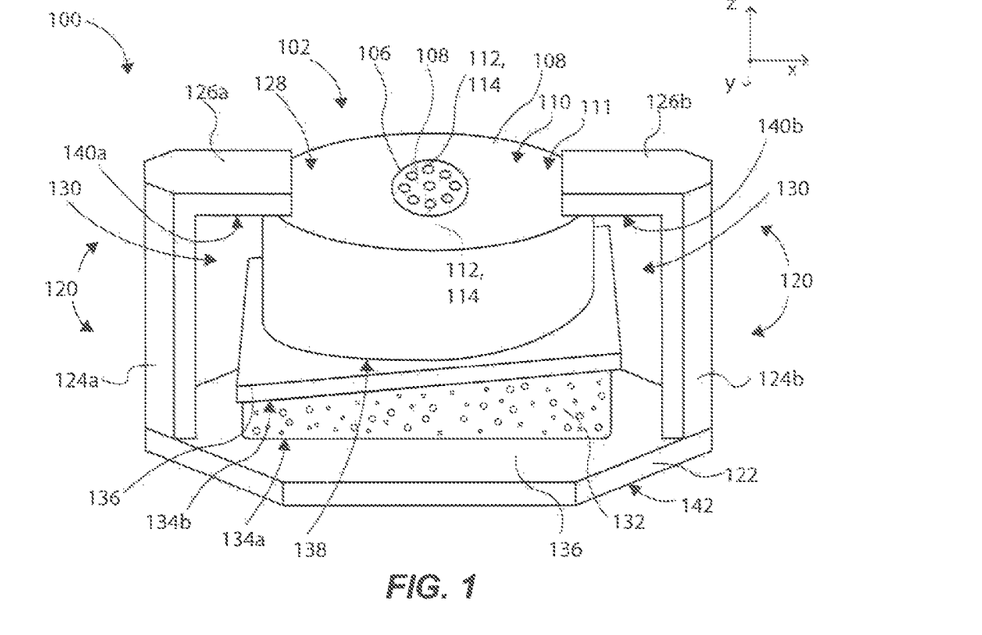
FIG. 1 shows a microsection sample stabilizer for stabilizing and aligning a microsection sample, in accordance with an example of the present disclosure.
Figure 2:
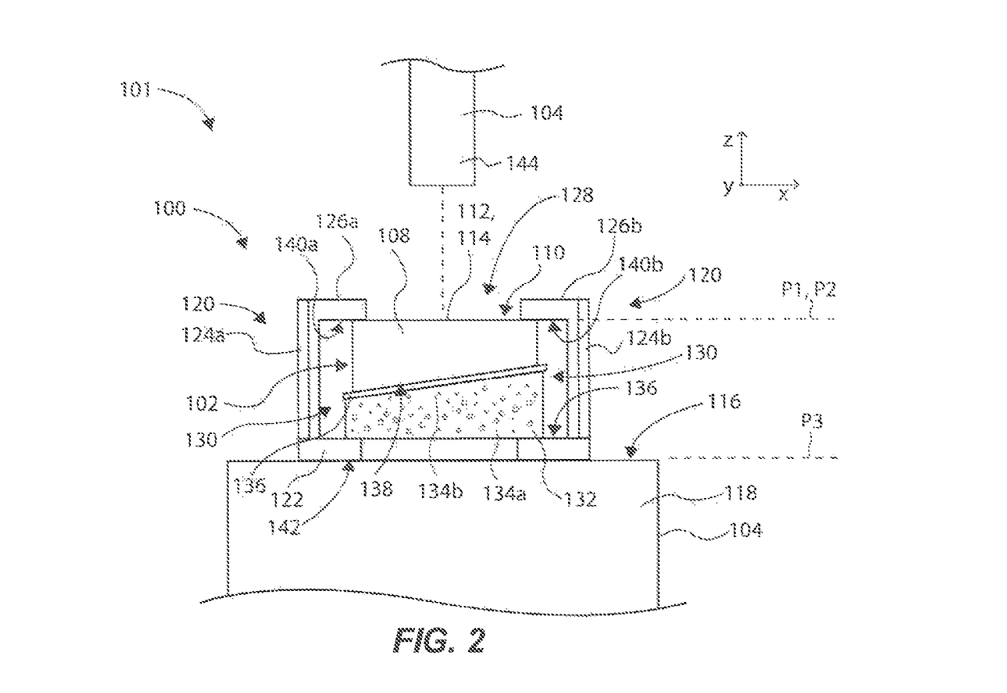
FIG. 2 shows a system for viewing or imaging the microsection sample with a microscope as supported by the microsection sample stabilizer of FIG. 1, in accordance with an example of the present disclosure.

To further describe the present technology, examples are now provided with reference to the figures. FIG. 1 shows a microsection sample stabilizer 100 stabilizing and aligning a microsection sample 102, in one example of the present disclosure. FIG. 2 shows a system 101 for viewing or inspecting the microsection sample 102, supported by the microsection sample stabilizer 100, with a microscope 104, in one example of the present disclosure.

As in the example shown, the microsection sample 102 can comprise a section or portion of an electronics component 106 (e.g., a pin style connector) that has been filled and encased or covered with a curable material 108 (e.g., an epoxy) that has been flowed onto and around the electronics component, such that the curable material is caused to flow into open areas through and around the electronics component 106, where the curable material 108 has cured and the encased electronics component sliced or cut to provide the microsection sample 102. The microsection sample 102 can be formed into a flat disc or puck as shown in FIG. 1. The microsection sample 102 can also be subjected to additional processing steps. For instance, the microsection sample 102 can be ground and/or polished (by hand) with various silicon carbide grit papers and diamond grit papers to form a relatively uniform or flat surface, otherwise known as an examination plane surface or just examination surface 110 for viewing and inspecting with the microscope 104 (e.g., a non-inverted stereo zoom microscope or a biological microscope). As a result of generating the examination plane surface 110, a sectioned sample element 112 of the electronics component 106 can be exposed about the examination plane surface 110, so that the sectioned sample element 112 can be visible by the human eye and/or by a microscope. The sectioned sample element 112 could be a two-dimensional surface area or "slice" of a pin 114, for instance, of the electronics component 106. Accordingly, the two-dimensional surface area of the pin 114 can be exposed for inspection for failure analysis, for instance. Note that the sectioned sample element 112 can be one or more pins 114 of the electronics component 106, or it can be any other product sample or element or component or material that may require inspection with a microscope as will be recognized by those skilled in the art. As such, the microsection sample comprising an electronics component in the form of a connector is not intended to be limiting in any way.

The microsection sample 102 can be polished as needed or desired. In one example, the microsection sample 102 can be polished down to a micron (e.g., 0.05 micron) surface variation of the examination plane surface 110, which is a relative flat surface (e.g., similarly to the flatness of a surface of a high-performance mirror of a telescope, for instance), One purpose of "sectioning" an encapsulated product sample, such as the electronics component 106, is to inspect the quality of one or more sectioned sample elements 112 (e.g., pins 114) with a microscope to determine if there exists any defects or problems with the sectioned sample element 112, such as for failure analysis purposes. For instance, defects can be discovered through microscopic inspection, such as plating defects in pins, dis-bonding of pins to molding, dis-bonding in molding to a connector shell, gold plating thickness variations, under-plating issues, and/or appropriate use of materials (e.g., types of gold or other metals used). Such defects in a product, such as an electronics component, can cause failure of larger devices and systems that rely on proper operation of the component. Note that nearly any electronics component (or other element or material) can be sectioned for viewing of possible defects, such as for analyzing soldering interfaces of circuit board assemblies, manufacturing defects in circuit boards, and others as will be recognized by those skilled in the art.

The examination plane surface 110 may not always be perfectly aligned after leveling and polishing for purposes of viewing with a microscope, because of the nature of hand grinding and polishing is not an ideal process to generate a perfectly level surface. Without some way of aligning and stabilizing the microsection sample 102, this can be problematic when viewing and inspecting the sectioned sample element 112 under a microscope along various surface areas (x and/or y directions) of the examination plane surface 110, because a stage 118 (FIG. 2) of the microscope 104 may need to be periodically or constantly adjusted in height (z direction), and/or because the magnification of the microscope 104 may need to be periodically or constantly adjusted. Moreover, a lower surface 116 of the microsection sample 102 may not always be flat and/or parallel relative to the examination plane surface 110, such that when the microsection sample 102 is rested on a planar surface 116 of the stage 118 of the microscope 104, the examination plane surface 110 may be positioned at an angle relative to horizontal and relative to the planar surface 116 of the stage 118. Thus, without aligning and stabilizing the microsection sample, a user may need to adjust the microscope (zoom and/or stage adjustments) when viewing different surface areas of the examination plane surface 110. This may affect image quality and measurements taken by the microscope and a computer system configured to analyze the examination plane surface 110.

Accordingly, it is desirable to have the examination plane surface 110 of the microsection sample 102 be as level and aligned as possible, and as parallel relative to the planar surface 116 of the stage 118 as possible. Furthermore, it is desirable to maintain this position of the microsection sample 102 throughout the viewing process or stage. As such, the present disclosure sets forth a microsection sample stabilizer 100. Therefore, once the microsection sample 102 is generated in its final form, as shown in FIG. 1A, the microsection sample 102 can be inserted into the microsection sample stabilizer 100 for aligning and stabilizing the microsection sample for viewing with the microscope 104. In some cases, this may include leveling the microsection sample relative to the microscope.

The microsection sample stabilizer 100 can comprise a frame 120 that comprises a base 122, and first and second intermediate frame supports 124a and 124b that can extend upward (e.g., orthogonally, on a curve, at an incline, or some combination of these) from the base 122. The frame 120 can further comprise at least one leveling portion. In one aspect, the frame 120 can comprise first and second leveling portions 126a and 126b, as shown, that extend inwardly (e.g., orthogonally) from the first and second intermediate frame supports 124a and 124b, and that are supported by the base 122. The first and second leveling portions 126a and 126b can oppose each other and be separated by a gap 111, and can therefore define a viewing window 128 for viewing at least a portion, or all of, the examination plane surface 110 of the microsection sample 102 with the microscope 104. In another aspect, the frame 120 can comprise a single leveling portion comprising a single structural component spanning or extending between the first and second intermediate frame supports 124a and 124b across the length of the examination plane surface 110. Such single leveling portion can comprise one or more apertures formed through it, so that the microscope can view through the aperture(s) defining the viewing window to the examination plane surface 110, for instance. Alternatively, the single leveling portion can be relatively skeletal or narrow, so that side areas of the examination plane surface can be viewed.

The viewing window 128 of the microsection sample stabilizer 100 contemplated herein can be any shape or form of an opening defined by the leveling portion(s), such as the first or second leveling portions 126a and 126b, or a single leveling portion (not shown).

The frame 120 can comprise or define an interior region 130 for receiving the microsection sample 102. The interior region 130 can be defined by the inner surfaces or boundaries of the microsection sample stabilizer 100, namely the base 122, the first and second intermediate frame supports 124a and 124b, and the first and second leveling portions 126a and 126b. Also, the interior region 130 can be in open or fluid communication with the viewing window 128.

The microsection sample stabilizer 100 can further comprise a compliant device 132 supported by the base 122, and situated within the interior region 130 of the frame 120, such that the compliant device 132 is operable with the frame 120 to support the microsection sample 102. In one aspect, the compliant device 132 can comprise a compliant or elastic body or material, such as a foam body, as shown, that has an element of elasticity, so that it can apply a counteracting biasing force when compressed. Therefore, a user can compress the compliant device 132 by applying a downward force on the compliant device 132 toward the base 122, and then the user can insert the microsection sample 102 in the interior region 130 between the compliant device 132 and the leveling portions 126a and 126b, and then the user can release the force applied to the compliant device 132 to cause or allow the compliant device 132 to at least partially expand, thereby applying an upward biasing force to the microsection sample 102 to bias it (apply a compliant or spring force to move or displace it) against the leveling portions 126a and 126b.

As shown in FIGS. 1 and 2, a first or lower end 134a of the compliant device 132 can be seated or biased against a first or interface surface 136 of the base 122, and a second or upper end 134b of the compliant device 132 can be biased or interfaced against a stabilization panel 136, which stabilization panel 136 the microsection sample stabilizer 100 can further comprise, and which can be an optional component. The stabilization panel 136 can be a rigid or semi-rigid plate or panel or layer situated between a second or lower surface 138 of the microsection sample 102 and the second or upper end 134b of the compliant device 132. In this way, the compliant device 132 can apply an upward biasing force to the stabilization panel 136 and the microsection sample 102 to bias and stabilize (and align) the examination plane surface 110 against first and second sample interface surfaces 140a and 140b of the first and second leveling portions 126a and 126b, such that different (e.g., opposing) surface areas of the examination plane surface 110 are biased against and interfaced to the first and second leveling portions 126a and 126b. In this manner, the microsection sample 102 is stabilized by the frame 120 so that the microsection sample 102 does not move (e.g., wiggle or shift or drift) when operated with and viewed via the microscope 104, because of the spring force applied to the microsection sample 102 by the compliant device 132. Note that, because of the nature of the compliant device 132 being a piece of foam, in this example, the second or upper end 134b can conform to the surface and position of the stabilization panel 136, while the stabilization panel 136 conforms to the position (i.e., plane) of the lower surface 138 of the microsection sample 102. Thus, regardless of the position or angle or surface variations of the lower surface 138 of the microsection sample 102, the stabilization panel 136 and the compliant device 132 are operable to conform to such lower surface 138, while biasing the examination plane surface 110 against the first and second leveling portions 126a and 126b. In other words, the microsection sample 102 does not necessarily need to be uniform in thickness, and the second or lower surface 138 can comprise variations (e.g., surface peaks and valleys), as the compliant device 132 can compress non-uniformly (i.e., different portions of the compliant device 132 can be compressed a greater degree than other portions), such that a biasing force is applied and maintained on the microsection sample 102 to maintain the examination plane surface 110 level and against the first and second leveling portions 126a and 126b.

Notably, because of the aforementioned configuration of the microsection sample stabilizer 100, the microsection sample 102 has been "leveled" by the microsection sample stabilizer 100, meaning that the examination plane surface 110 is substantially level or parallel relative to the planar surface 116 of the stage 118, Therefore, the microscope 104 can view various surface areas of the examination plane surface 110, and therefore the sectioned sample element 112, in the x and/or y directions without adjustments of the microscope 104 (and/or the stage 118) in the z direction. More particularly, the base 122 can comprise a lower surface 142 that can be generally flat or planar, and that rests or interfaces against the planar surface 116 of the stage 118. The first and second leveling portions 126a and 126b, and more particularly the first and second sample interface surfaces 140a and 140b, respectively, can be generally parallel to the base 122, because the first and second sample interface surfaces 140a and 140b each comprise a flat or planar surface that is substantially parallel to the lower surface 142 of the base 122, and also substantially parallel to the planar surface 116 of the stage 118. Said another way, the examination plane surface 110 can define a first plane P1, and the first and second leveling portions 126a and 126b can define a second plane P2 substantially parallel to (and substantially congruent with) the first plane P1 when the microsection sample 102 is secured within the microsection sample stabilizer 100. Further, the lower surface of the base 122 can define a third plane P3 that is substantially parallel to the first plane P1 and to the second plane P2. Therefore, the first, second, and third planes P1, P2, and P3 can be parallel or substantially parallel to each other.

The frame 120, therefore, provides a mechanism or device for "aligning" the microsection sample 102, meaning that the examination plane surface 110 is parallel or substantially parallel to the planar surface 116 of the stage 118, and therefore orthogonal or substantially orthogonal to the axis of the viewing aperture of an objective lens 144 of the microscope 104. In this way, the microsection sample 102, supported by the microsection sample stabilizer 100, can be moved in the x and/or y directions relative to the objective lens 144, so that various surface areas or portions of the examination plane surface 110 can be viewed without adjusting the position of the microsection sample stabilizer 100 in the z direction relative to the objective lens 144. This is beneficial because it increases or improves image quality of various images captured by the microscope 104 along the examination plane surface 110, which assists with providing more accurate and reliable critical dimensions and measurements of the sectioned sample element 112 of the electronics component 106.

Supporting a microsection sample with a particular microsection sample stabilizer of the present disclosure can further protect the examination plane surface (e.g., 110) from damage, such as scratches or other anomalies, that may affect proper inspection of the examination plane surface. This is because the microsection sample (e.g., 102, 202, etc.) can be enclosed or protected by the particular microsection sample stabilizer (e.g., 100) to protect it from damage during handling and moving.

The compliant device 132 can be a type of a compression spring that, when at least partially compressed, applies a biasing force, which can comprise an elastic body formed from at least one of rubber, elastomer, polyester foam, polyurethane foam, or any other suitable material or combination of materials that can store and release energy, and essentially act as a compression spring.

The frame 120 can be a uniform, single part or structure formed of a metal, composite, plastic, or other rigid or semi-rigid materials, or it can be comprised of a plurality of parts attached or joined to each other by suitable means, such as by fasteners, tongue and groove or other male/female type interfaces, and others as will be recognized by those skilled in the art. The parts of the frame 120 should be rigid enough or stiff enough so as to not noticeably or substantially flex or deflect in response to the biasing force from the compliant device 132 pressing against the microsection sample 102, otherwise the examination plane surface 110 may not be precisely aligned, as desired and required for viewing by the microscope 104.

Figure 3:
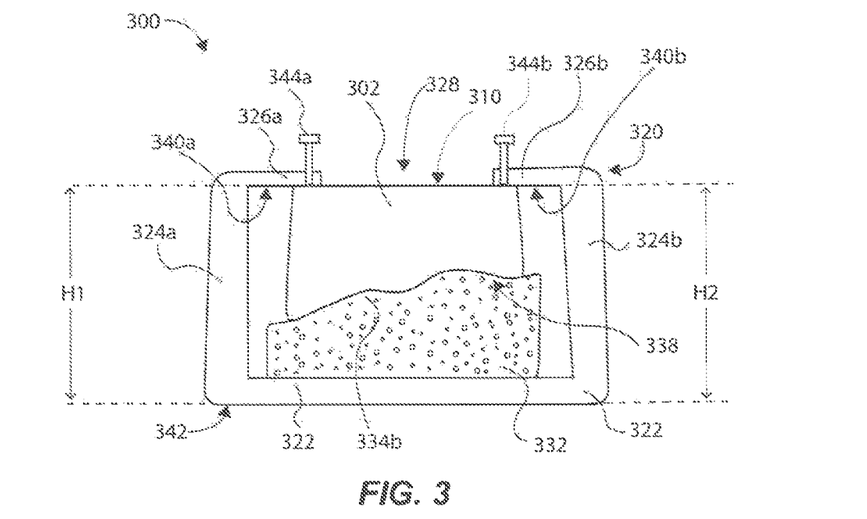
FIG. 3 shows a side view of a microsection sample stabilizer for stabilizing and aligning a microsection sample, in accordance with an example of the present disclosure.

FIG. 3 illustrates a microsection sample stabilizer 300 for stabilizing and aligning a microsection sample 302 for viewing with a microscope (e.g. 104), in an example of the present disclosure. The microsection sample 302 can be the same or similar as discussed above regarding the microsection sample 102, and therefore can comprise an examination plane surface 310 and a sectioned sample element (e.g., similar to sectioned sample element 112) exposed about the examination plane surface 310 for viewing with the microscope. The microsection sample stabilizer 300 can also be configured to function similarly as discussed above regarding the microsection sample stabilizer 100, as such, the above discussion is incorporated here with respect with the microsection sample stabilizer 300 where appropriate, and in light of the below described differences between the two examples, as will be recognized by those skilled in the art. The microsection sample stabilizer 300 can comprise a frame 320, which can be a single body having a generally rectangular shape, that receives and supports a compliant device 332 and the microsection sample 302. Thus, the frame 320 can comprise a base 322, and first and second intermediate frame supports 324a and 324b that extend away (e.g., generally orthogonally) from the base 322. The frame 320 can further comprise first and second leveling portions 326a and 326b extending inwardly (e.g., orthogonally) from the first and second intermediate frame supports 324a and 324b. The first and second leveling portions 326a and 326b can define a viewing window 328 for viewing the examination plane surface 310 of the microsection sample 302 with the microscope.

The frame 320 can comprise or define an interior region 330 for receiving the microsection sample 302. The interior region 330 can be defined at least in part by the inner boundaries or surfaces of the base 322, the first and second intermediate frame supports 324a and 324b, and the first and second leveling portions 326a and 326b. The interior region 330 can be in open or fluid communication with the viewing window 328. The microsection sample stabilizer 300 can further comprise a compliant device 332 (e.g., a foam body) situated within the interior region 330 of the frame 320 and supported by the base 322. As shown, a second or an upper end 334*b* of the compliant device 332 can be biased against a second or lower surface 338 of the microsection sample 320. In this way, the compliant device 332 can apply an upward biasing force to the microsection sample 302 to bias and stabilize the examination plane surface 310 against first and second sample interface surfaces 340*a* and 340*b*. Thus, the microsection sample 302 is stabilized by the frame 320 so that it does not move (e.g., wiggle or shift or otherwise move) when viewed by the microscope, because of the biasing force applied by the compliant device 332. Note that, because of the nature of the compliant device 332 being a piece of foam, (in this example) the second or upper end 334*b* of the compliant device 332 can conform to the irregular shape of the second or lower surface 338 of the microsection sample 302. This may be useful in applications where the microsection sample 302 can have varying protrusions and surface variations about the lower surface of the microsection sample 302. Note that two or more pieces of foam or other elastic body can be used.

Similarly as discussed above and shown in FIGS. 1 and 2, the microsection sample 302 illustrated in FIG. 3 is shown as having been "leveled" by the microsection sample stabilizer 300, meaning that the examination plane surface 310 is substantially level or parallel relative to a planar surface (e.g., 116) of a stage (e.g., 118) of a microscope (e.g., 104). Accordingly, the base 322 can comprise a lower surface 342 that can be generally flat or planar, and that rests and interfaces against the planar surface of the stage (e.g., 118). The first and second leveling portions 326*a* and 326*b* can be generally parallel to the base 322, such that the first and second sample interface surfaces 340*a* and 340*b* each comprise a flat or planar surface that is substantially parallel to the lower surface 342 of the base 322, and also substantially parallel to the planar surface (e.g., 116) of the stage (e.g., 118). The result of such orientation provides "aligning" of the microsection sample 302, meaning that the examination plane surface 310 is substantially parallel to the planar surface (e.g., 116) of the stage (e.g., 118), and therefore substantially orthogonal to the axis of the viewing aperture of an objective lens (e.g., 144) of the microscope (e.g., 104).

Note that the first and second leveling portions 326*a* and 326*b* can comprise the same height relative to the lower surface 342 of the base 322. That is, a height H1 between the first sample interface surface 340*a* and the lower surface 342 of the base 322 can be the substantially the same as a height H2 between the second sample interface surface 340*b* and the lower surface 342 of the base 322. In this manner, the microsection sample stabilizer 300 can ensure that the examination plane surface 310 is level relative to the stage of the microscope.

The microsection sample stabilizer 300 can further comprise one or more position adjustment devices 344*a* and 344*b*, such as metal or nylon screws, bolts, fasteners, or other devices operable to facilitate adjustment of a position of the microsection sample 302 when supported by the microsection sample stabilizer 300. More specifically, the position adjustment devices 344*a* and 344*b* can be threadably received through respective apertures of the first and second leveling portions 326*a* and 326*b*, such that an end of the position adjustment devices 344*a* and 344*b* can be interfaced to the examination plane surface 310. In this manner, a user can operate a tool (e.g., screwdriver, wrench), or even use fingers, to rotate one or more of the position adjustment devices 344*a* and 344*b* to cause them to vertically and threadably move toward (or away from) the microsection sample 302. This can cause adjustment of the orientation of the examination plane surface 310, because the compliant device 332 accounts for such adjustments via the upward biasing force applied by the compliant device 332. Thus, the one or more position adjustment devices 344*a* and 344*b* can be operated for fine-tune adjustments of the orientation and alignment of the examination plane surface 310 as desired after the microsection sample 302 has been supported by the microsection sample stabilizer 300. This can be useful for a particular microsection sample that may have an odd shape or examination plane surface variation or protrusion. In one example, four position adjustment devices (e.g., each like 344*a*) can be supported by the first and second leveling portions 326*a* and 326*b* (e.g., one pair on each leveling portion). Operation of the two pairs of position adjustment devices can facilitate positional adjustment in a "tip-tilt" manner of the orientation of the examination plane surface 310 (i.e., rotational adjustment of the microsection sample about two rotational degrees of freedom in the respective xy axes). Note that the other examples discussed herein can include one or more of such position adjustment device(s) described above for adjusting the position of a particular microsection sample supported by a particular frame.

Figure 4:
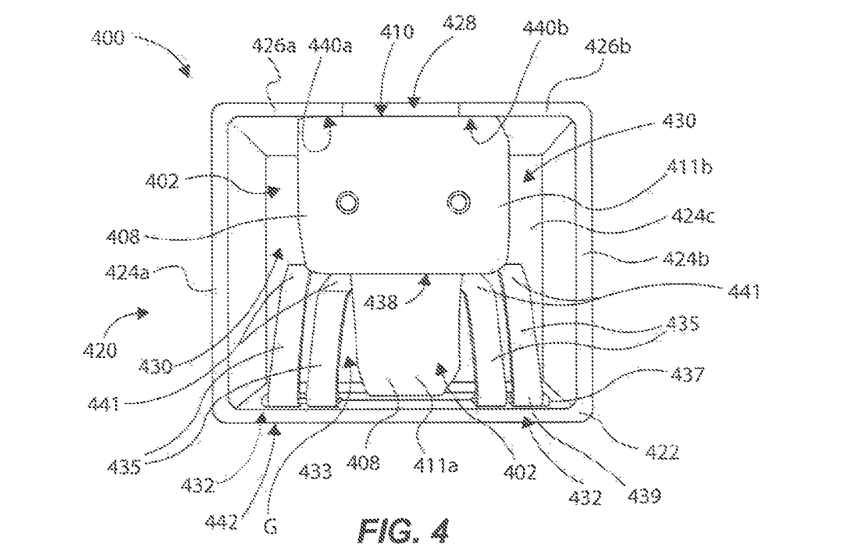
FIG. 4 shows a perspective side view of a microsection sample stabilizer for stabilizing and aligning a microsection sample, in accordance with an example of the present disclosure.

FIG. 4 illustrates a microsection sample stabilizer 400 for stabilizing and aligning a microsection sample 402 for viewing with a microscope (e.g., 104), in one example of the present disclosure. The microsection sample 402 can be the same or similar as discussed above regarding the microsection sample 102, and therefore can comprise an examination plane surface 410 and a sectioned sample element (e.g., 112) exposed about the examination plane surface 410 for viewing with the microscope. The microsection sample stabilizer 400 can also be configured to function similarly as discussed above regarding the microsection sample stabilizer 100, as such, the above discussion is incorporated here with respect with the microsection sample stabilizer 400 where appropriate, and in light of the below described differences between the two examples, as will be recognized by those skilled in the art. Accordingly, the microsection sample stabilizer 400 can comprise a frame 420, which can be a single body shaped as a box or cuboid, and that receives and supports a compliant device 432 and the microsection sample 402. Thus, the frame 420 can comprise a base 422, and intermediate frame supports 424*a-c*, which can be interconnected walls that extend orthogonally from the base 422. The frame 420 can further comprise first and second leveling portions 426*a* and 426*b* extending inwardly and orthogonally from the intermediate frame supports 424*a-c*, and therefore supported by the base 422. The first and second leveling portions 426*a* and 426*b* can be part of a single panel or wall of the box-shaped frame 422, and can have or define a viewing window 428 for viewing the examination plane surface 410 of the microsection sample 402 with the microscope.

The frame 420 can comprise or define an interior region 430 for receiving the microsection sample 402, The interior region 430 can be defined by the boundaries of the base 422, the intermediate frame supports 424*a-c*, and the first and second leveling portions 426*a* and 426*b*. The interior region 430 can be in open or fluid communication with the viewing window 428.

The microsection sample 402 can include a lower portion 411*a* and an upper portion 411*b*, where the lower portion 411*a* is smaller in shape and size than the upper portion 411*b*. This is because, in this example, an electronics component (not shown), encapsulated in a cured epoxy 408, may have an irregular shape, which results in the shape of the microsection sample 402 shown. The compliant device 432 can be configured to conform or account for such irregular shape of the microsection sample 402. Specifically, the compliant device 432 can comprise a base plate 433 interfaced to the base 422. A shaft 437 can be attached to the base plate 433 that rotatably supports a plurality of torsion spring arms 435 that each include a torsion spring (not shown) integrated between the shaft 437 and a coupling end 439 of the torsion spring arms 435. Thus, each torsion spring arm 435 is configured to apply generally upward biasing force via a spring force applied by the respective torsion spring. Therefore, an upper end 441 of each torsion spring arm 435 can be biased against a lower surface 438 of the microsection sample 420. In this way, the compliant device 432 can apply an upward biasing force to the microsection sample 402 to bias and stabilize the examination plane surface 410 against first and second sample interface surfaces 440a and 440b. Thus, the microsection sample 402 is stabilized by the frame 420 so that it does not move or wiggle or shift when viewed by the microscope, because of the biasing force applied upwardly by the compliant device 432. Note that the plurality of torsion spring arms 435 each operate independently from each other, so that one or more upper ends 441 can conform to the irregular shape of the lower surface 438 of the microsection sample 402. In addition, a gap G between left and right pairs of the torsion spring arms 435 can accommodate the irregular shape of the first portion 411a that extends downwardly between left and right pairs of the torsion spring arms 435.

Similarly as discussed regarding FIGS. 1 and 2, the microsection sample 402 has been "leveled" by the microsection sample stabilizer 400, meaning that the examination plane surface 410 is substantially level or parallel relative to a planar surface (e.g., 116) of a stage (e.g., 118) of a microscope (e.g., 104).

Accordingly, the base 422 can comprise a lower surface 442 that can be generally flat or planar, and that rests and interfaces against the planar surface of the stage (e.g., 118). The first and second leveling portions 426a and 426b can be generally parallel to the base 422, such that the first and second sample interface surfaces 440a and 440b each comprise a flat or planar surface that is substantially parallel to the lower surface 442 of the base 422, and also substantially parallel to the planar surface (e.g., 116) of the stage (e.g., 118). The result of such orientation provides "aligning" of the microsection sample 402, meaning that the examination plane surface 410 is substantially parallel to the planar surface (e.g., 116) of the stage (e.g., 118) and therefore substantially orthogonal to the viewing aperture of an objective lens (e.g., 144) of the microscope (e.g., 104).

Note that the compliant device 432 can alternatively comprise a plurality of coil springs, foam pillars, or other individual compression springs that function similarly as the torsion spring arms 435 to apply individual biasing forces to portions of the lower surface 438 of the second portion 411b of the microsection sample 402. In other examples, a particular compliant device can comprise one or more of a torsional spring, a leaf spring, or other suitable springs or compliant elements or devices that operate to apply a force to a particular microsection sample.

It is noted, and those skilled in the art will recognize, that any of the example microsection sample stabilizers discussed herein can utilize any of the compliant devices discussed herein, even if such compliant devices are particularly or specifically described as being a certain type operable with the presently discussed example microsection sample stabilizer.

Figure 5:
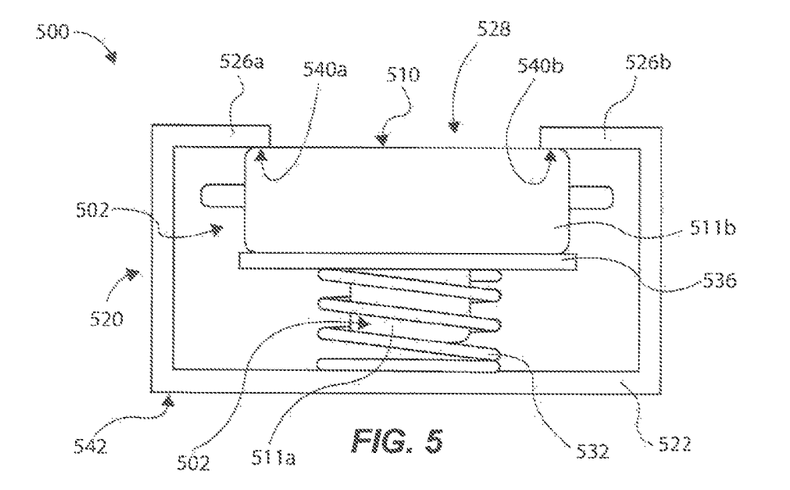
FIG. 5 shows a side view of a microsection sample stabilizer for stabilizing and aligning a microsection sample, in accordance with an example of the present disclosure.

FIG. 5 illustrates a microsection sample stabilizer 500 for stabilizing and aligning a microsection sample 502 for viewing with a microscope (e.g., 104), in one example of the present disclosure. The microsection sample 502 can be the same or similar as discussed above regarding the microsection sample 102 (and 302), and therefore can comprise an examination plane surface 510 and a sectioned sample element (e.g., 112) exposed about the examination plane surface 510 for viewing with the microscope. The microsection sample stabilizer 500 can also be configured to function similarly as discussed above regarding the microsection sample stabilizer 100, as such, the above discussion is incorporated here with respect with the microsection sample stabilizer 500 where appropriate, and in light of the below described differences between the two examples, as will be recognized by those skilled in the art. Accordingly, the microsection sample stabilizer 500 can comprise a frame 520, which can have the same or similar components as the frame 120, and therefore will not be labeled and discussed in great detail. One difference of the microsection sample stabilizer 500 is that it can comprise a compliant device in the form of a coil spring 532 biased to a stabilization panel 536. The stabilization panel 536 can include an aperture (not shown) to facilitate passage of a lower portion 511a of the microsection sample 502, while an upper portion 511b is supported by the stabilization panel 536. In this manner, the compliant device 532 can apply an upward biasing force to the microsection sample 502 to bias and stabilize the examination plane surface 510 against first and second sample interface surfaces 540a and 540b. Thus, the microsection sample 502 is stabilized by the frame 520 so that it does not move or wiggle or shift when viewed by the microscope through a viewing window 528, because of the spring force or biasing force applied upwardly by the compliant device 532. Note that, because of the nature of the compliant device being a coil spring 532, the coil spring 532 can bend or flex radially to accommodate for a shape of a lower surface of the second portion 511b of the microsection sample 502 (see e.g., the off-plane lower surface of microsection sample 102). Moreover, the coil spring 532 can have an inner diameter area that receives the first portion 511a of the microsection sample 502, thereby further accommodating for an irregular shape or protrusion of the microsection sample 502.

Similarly as discussed regarding FIGS. 1 and 2, the microsection sample 502 has been "leveled" by the microsection sample stabilizer 500, meaning that the examination plane surface 510 is substantially level or parallel relative to a planar surface (e.g., 116) of a stage (e.g., 118) of a microscope (e.g., 104). Accordingly, a base 522 can comprise a lower surface 542 that can be generally flat or planar, and that rests and interfaces against the planar surface of the stage (e.g., 118). The first and second leveling portions 526a and 526b can be generally parallel to the base 522, such that the first and second sample interface surfaces 540a and 540b each comprise a flat or planar surface that is substantially parallel to the lower surface 542 of the base 522, and also substantially parallel to the planar surface (e.g., 116) of the stage (e.g., 118). The result of such orientation provides "aligning" of the microsection sample 502, meaning that the examination plane surface 510 is substantially parallel to the planar surface (e.g., 116) of the stage (e.g., 118), and therefore substantially orthogonal to the viewing aperture of an objective lens (e.g., 144) of the microscope (e.g., 104).

Figure 6:
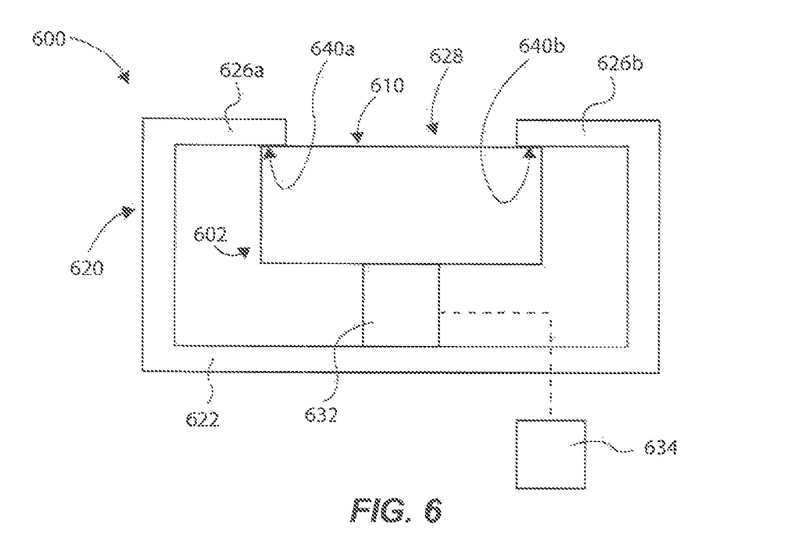
FIG. 6 shows a side view of a microsection sample stabilizer for stabilizing and aligning a microsection sample, in accordance with an example of the present disclosure.

FIG. 6 illustrates a microsection sample stabilizer 600 for stabilizing and aligning a microsection sample 602 for viewing with a microscope (e.g., 104), in one example of the present disclosure. The microsection sample 602 can be the same or similar as discussed above regarding the microsection sample 102, and therefore can comprise an examination plane surface 610 and a sectioned sample element (e.g., 112) exposed about the examination plane surface 610 for viewing with the microscope. The microsection sample stabilizer 600 can also be configured to function similarly as discussed above regarding the microsection sample stabilizer 100, as such, the above discussion is incorporated here with respect with the microsection sample stabilizer 600 where appropriate, and in light of the below described differences between the two examples, as will be recognized by those skilled in the art. Accordingly, the microsection sample stabilizer 600 can comprise a frame 620, which can have the same or similar components as the frame 120, and therefore will not be labeled and discussed in great detail. One difference of the microsection sample stabilizer 600 is that it can comprise an active or actuatable compliant device 632 that can comprise one or more mechanisms that can be actively controlled to apply a biasing force to the microsection sample 602 to bias and stabilize the examination plane surface 610 against first and second sample interface surfaces 640a and 640b. Thus, in one example, the compliant device 632 can comprise a piezoelectric actuator operable to bias the microsection sample 602 against first and second leveling portions 626a and 626b in response to activation of the piezoelectric actuator with a control system 634, such as an actuator control system that applies and controls a voltage to the piezoelectric actuator. Note that the compliant device 632 is shown as a box, but it can comprise one or more piezoelectric elements or actuators, such as piezo beams or contracting actuators, piezo longitudinal actuators, piezo sheer actuators, piezo tube actuators, etc. Therefore, a relatively small voltage applied by a voltage source of the actuator control system can cause an upward biasing force to the microsection sample 602. This may be useful and beneficial in microelectromechanical systems (MEMS) devices where the microsection sample 602 is sized on a micro scale or micro level.

Figure 7:
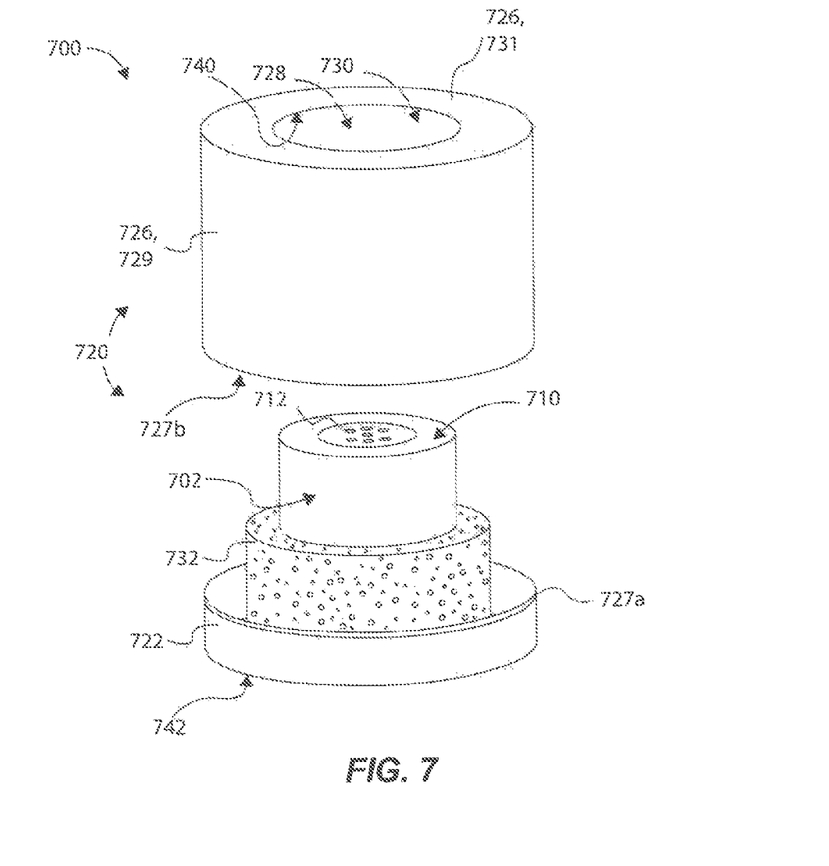
FIG. 7 shows an isometric of a microsection sample stabilizer, and in an open position, for stabilizing and aligning a microsection sample, in accordance with an example of the present disclosure.

In another example, the compliant device 632 can comprise a bladder operable to be filled with a fluid (in a closed or open loop) via operation of the control system 634 (e.g., a fluid control system) to bias the microsection sample 602 against the first and second sample interface surfaces 640a and 640b. Note that the fluid can be a gas or liquid. Thus, the bladder can be filled with a fluid to expand and therefore apply an upward biasing force. This may be useful or beneficial when a lower surface of the microsection sample 602 is irregular, such that the bladder can conform to the shape of the microsection sample 602 to better stabilize it with the microsection sample stabilizer 600. This may also be useful in microfluidic devices where the microsection sample is on a microscale, FIG. 7 illustrates a microsection sample stabilizer 700 for stabilizing and aligning a microsection sample 702 for viewing with a microscope (e.g. 104), in an example of the present disclosure. The microsection sample 702 can be the same or similar as discussed above regarding the microsection sample 102, and therefore can comprise an examination plane surface 710 and a sectioned sample element 712 (e.g., similar to sectioned sample element 112) exposed about the examination plane surface 710 for viewing with the microscope. The microsection sample stabilizer 700 can also be configured to function similarly as discussed above regarding the microsection sample stabilizer 100, as such, the above discussion is incorporated here with respect with the microsection sample stabilizer 700 where appropriate, and in light of the below described differences between the two examples; as will be recognized by those skilled in the art. The microsection sample stabilizer 700 can comprise a frame 720, which can be a two-piece body having a generally cylindrical shape, and that receives and supports a compliant device 732 and the microsection sample 702. Thus, the frame 720 can comprise a base 722 and a leveling portion 726 rotatably and threadably coupleable to each other via threaded portions 727a and 727b, respectively. Alternatively; the leveling portion 726 can be latched or otherwise removably coupled to the base 722 in a suitable manner recognized by those skilled in the art. The leveling portion 726 can be defined by a sidewall 729 and a leveling section 731. The leveling section 731 can extend inwardly from the sidewall 729, and can define a viewing window 728 for viewing the examination plane surface 710 of the microsection sample 702 with the microscope.

The frame 720, when assembled, can comprise or define an interior region 730 for receiving the microsection sample 702. The interior region 730 can be defined at least in part by the inner boundaries or surfaces of the base 722 and the leveling portion 726; which can be a generally cylindrically shaped volume defined by the interior region 730; however, other shapes are possible, such as a cuboid shaped frame. The interior region 730 can be in open or fluid communication with the viewing window 728.

The microsection sample stabilizer 700 can further comprise a compliant device 732 (e.g., a foam body) situated within the interior region 730 of the frame 720 and supported by the base 722. In this way, the compliant device 732 can apply an upward biasing force to the microsection sample 702 to bias and stabilize the examination plane surface 710 against a sample interface surface 740 of the leveling portion 726. Thus, the microsection sample 702 is stabilized by the frame 720 so that it does not move (e.g., wiggle or shift or otherwise move) when viewed by the microscope, because of the biasing force applied by the compliant device 732. Note that, because of the nature of the compliant device 732 being a piece of foam; (in this example) the upper end of the compliant device 732 can conform to the irregular shape of the lower surface of the microsection sample 702. This may be useful in applications where the microsection sample 702 can have varying protrusions and surface variations about the lower surface of the microsection sample 702. Note that two or more pieces of foam or other elastic body can be used.

The viewing window 728 can be a single window that is circular in shape, or other suitable shape, to allow viewing of at least a portion of the examination plane surface 710. Thus, the viewing window 728 can have an area that is smaller than a surface area of the examination viewing plane 710, so that the microsection sample 702 can be biased to the leveling section 731 of the leveling portion 726 of the frame 720. Note that FIG. 7 shows an open or unassembled position of the frame 720, which allows a user to access the interior region 730 for insertion of the microsection sample 702 and the compliant device 732. Once inserted, the user can screw the leveling portion 726 onto the base 722, which presses the microsection sample 702 downwardly, thereby compressing the compliant device 732. Thus, the compliant device 732 applies the biasing force to the microsection sample 702 when the frame 720 is assembled.

Similarly as discussed above and shown in FIGS. 1 and 2, the microsection sample 702 can be "aligned" by the microsection sample stabilizer 700 (when the frame 720 is assembled), meaning that the examination plane surface 710 is substantially level or parallel relative to a planar surface (e.g., 116) of a stage (e.g., 118) of a microscope (e.g., 104). Accordingly, the base 722 can comprise a lower surface 742 that can be generally flat or planar, and that rests and interfaces against the planar surface of the stage (e.g., 118). The leveling section 731 of the leveling portion 726 can be generally parallel to the base 722, such that the sample interface surface 740 comprises a flat or planar surface that is substantially parallel to the lower surface 742 of the base 722, and also substantially parallel to the planar surface (e.g., 116) of the stage (e.g., 118). The result of such orientation provides "aligning" of the microsection sample 702, meaning that the examination plane surface 710 is substantially parallel to the planar surface (e.g., 116) of the stage (e.g., 118), and therefore substantially orthogonal to the axis of the viewing aperture of an objective lens (e.g., 144) of the microscope (e.g., 104).

Figure 8:
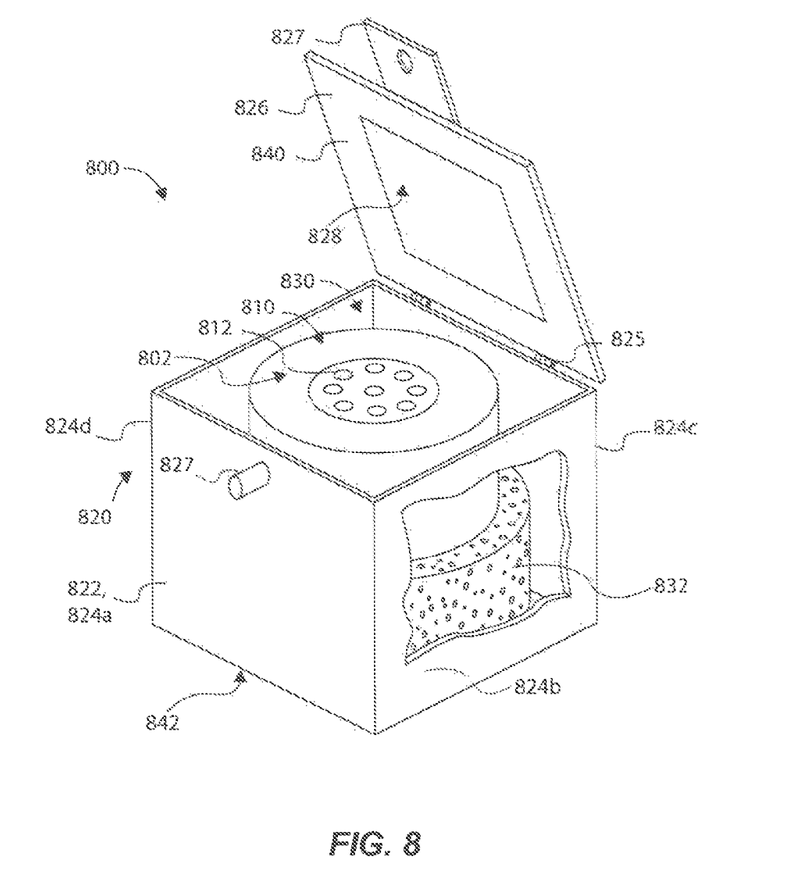
FIG. 8 shows an isometric view of a microsection sample stabilizer, and in an open position, for stabilizing and aligning a microsection sample, in accordance with an example of the present disclosure.

FIG. 8 illustrates a microsection sample stabilizer 800 for stabilizing and aligning a microsection sample 802 for viewing with a microscope (e.g., 104), in one example of the present disclosure. The microsection sample 802 can be the same or similar as discussed above regarding the microsection sample 102, and therefore can comprise an examination plane surface 810 and a sectioned sample element 812 (e.g., 112) exposed about the examination plane surface 810 for viewing with the microscope. The microsection sample stabilizer 800 can also be configured to function similarly as discussed above regarding the microsection sample stabilizer 100, as such, the above discussion is incorporated here with respect with the microsection sample stabilizer 800 where appropriate, and in light of the below described differences between the two examples, as will be recognized by those skilled in the art. Accordingly, the microsection sample stabilizer 800 can comprise a frame 820, which can be a two-piece body shaped as a box or cuboid, and that receives and supports a compliant device 832 and the microsection sample 802. Thus, the frame 820 can comprise a base 822 having intermediate frame walls or supports 824a-d, which can be interconnected walls that extend orthogonally from the base 822. The frame 820 can further comprise a leveling portion 826 that can be pivotally coupled to the intermediate frame support 824c via one or more hinges 825, and therefore supported by the base 822. The leveling portion 826 can be a single panel or wall attached to the box-shaped base 822 on one end at the frame support 824c, and latchable to the frame support 824a at the other end of the leveling portion 826 via a latch device 827 (e.g., bracket and pin/hole latch, or other latch). Thus, the leveling portion 826 is operable and movable between an open position (shown) and a closed position (not shown) via the at least one hinge 825.

The leveling portion 826 can have or define a viewing window 828 for viewing the examination plane surface 810 of the microsection sample 802 with the microscope. The frame 820 can comprise or define an interior region 830 for receiving the microsection sample 802. The interior region 830 can be defined by the boundaries of the base 822 and the leveling portion 826. The interior region 830 can be in open or fluid communication with the viewing window 828.

The microsection sample stabilizer 800 can further comprise a compliant device 832 (e.g., a foam body) situated within the interior region 830 of the frame 820 and supported by the base 822. The compliant device 832 can be biased against a lower surface of the microsection sample 820 to apply an upward biasing force to the microsection sample 802 to bias and stabilize the examination plane surface 810 against a sample interface surface 840 of the leveling portion 826 (when the leveling portion 826 is closed and latched). Thus, the microsection sample 802 can be stabilized by the frame 820 so that it does not move (e.g., wiggle or shift or otherwise move) when viewed by the microscope, because of the biasing force applied by the compliant device 832. Note that, because of the nature of the compliant device 832 being a piece of foam, (in this example) the upper end of the compliant device 832 can conform to the irregular shape of the lower surface of the microsection sample 802. This may be useful in applications where the microsection sample 802 can have varying protrusions and surface variations about the lower surface of the microsection sample 802. Note that two or more pieces of foam or other elastic body can be used.

Similarly as discussed regarding FIGS. 1 and 2, the microsection sample 802 can been "aligned" by the microsection sample stabilizer 800 (when closed and latched), meaning that the examination plane surface 810 is substantially level or parallel relative to a planar surface (e.g., 116) of a stage (e.g., 118) of a microscope (e.g., 104). Accordingly, the base 822 can comprise a lower surface 842 that can be generally flat or planar, and that rests and interfaces against the planar surface of the stage (e.g., 118). The leveling portion 826 can be generally parallel to the base 822, such that the sample interface surface 840 comprises a flat or planar surface that is substantially parallel to the lower surface 842 of the base 822, and also substantially parallel to the planar surface (e.g., 116) of the stage (e.g., 118). The result of such orientation provides "aligning" of the microsection sample 802, meaning that the examination plane surface 810 is substantially parallel to the planar surface (e.g., 116) of the stage (e.g., 118) and therefore substantially orthogonal to the viewing aperture of an objective lens (e.g., 144) of the microscope (e.g., 104).

Note that the compliant device 832 can alternatively comprise a plurality of coil springs, foam pillars, or other individual compression springs that function similarly as the torsion spring arms 835 to apply individual biasing forces to portions of the lower surface 838 of the second portion 811b of the microsection sample 802. In other examples, a particular compliant device can comprise one or more of a torsional spring, a leaf spring, or other suitable springs or compliant elements or devices that operate to apply a force to a particular microsection sample. Note that the various microsection sample stabilizers of the present disclosure have the capability of receiving and supporting various sizes of microsection samples, which provides flexibility of the microsection sample stabilizer to be used for differently sized and shaped samples. Further note that the various microsection sample stabilizers of the present disclosure reduce the amount of inspection time of a particular microsection sample, because the microsection sample can be quickly inserted into a particular microsection sample stabilizer while the compliant device is compressed, and then the compliant device can be released to quickly stabilize and level the microsection sample. Compare this to existing methods that utilize clay to stabilize a particular microsection sample, which is time consuming and unreliable, and can cause contamination of the sample and drifting of the sample.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A microsection sample stabilizer for use with a microscope, comprising:
   a frame comprising a base and at least one leveling portion supported by the base, the at least one leveling portion defining a viewing window;
   an interior region within the frame, defined by the base and the at least one leveling portion, the viewing window in open communication with the interior region; and
   at least one compliant device operable within the interior region of the frame and operable to be supported by the base, the compliant device operable to receive and support a microsection sample, the compliant device operable to bias a microsection sample against the at least one leveling portion of the frame to stabilize and align the microsection sample, such that an examination plane surface of the microsection sample is viewable through the viewing window,
   wherein the compliant device comprises a piezoelectric actuator operable to bias the microsection sample against the at least one leveling portion in response to actuation of the piezoelectric actuator.

2. The microsection sample stabilizer of claim 1, wherein the at least one leveling portion comprises:
   a sample interface surface operable to receive and interface with an examination plane surface of the microsection sample; and
   at least one intermediate frame support extending from the base, and supporting the at least one leveling portion.

3. The microsection sample stabilizer of claim 2, wherein the at least one intermediate frame support comprises first and second intermediate frame supports, and wherein the at least one leveling portion comprises first and second leveling portions supported by respective first and second intermediate frame supports.

4. The microsection sample stabilizer of claim 3, wherein the first and second leveling portions comprise the same height relative to a lower surface of the base.

5. The microsection sample stabilizer of claim 2, wherein the first and second leveling portions each comprise a sample interface surface, and wherein each of the first and second sample interface surfaces is substantially parallel to a lower surface of the base.

6. The microsection sample stabilizer of claim 1, wherein the compliant device comprises a compression spring.

7. The microsection sample stabilizer of claim 6, wherein the compression spring comprises at least one of a coil spring, a torsional spring, or a leaf spring.

8. The microsection sample stabilizer of claim 6, wherein the compression spring comprises an elastic body formed from at least one of rubber, elastomer, polyester foam, or polyurethane foam.

9. The microsection sample stabilizer of claim 1, further comprising one or more position adjustment devices supported by at least one of the first or second leveling portions, wherein the one or more position adjustment devices are operable to adjust a position of the microsection sample when supported by the microsection sample stabilizer.

10. The microsection sample stabilizer of claim 1, wherein the at least one leveling portion is rotatably and removably coupled to the base, and wherein the frame is generally cylindrical in shape.

11. The microsection sample stabilizer of claim 1, wherein the at least one leveling portion is pivotally coupled to the base, and movable between open and closed positions, such that the compliant device and the microsection sample are insertable into the interior region when the at least one leveling portion is in the open position.

12. A microsection sample stabilizer for use with a microscope, comprising:
    a frame comprising a base and at least one leveling portion supported by the base, the at least one leveling portion defining a viewing window;
    an interior region within the frame, defined by the base and the at least one leveling portion, the viewing window in open communication with the interior region; and
    at least one compliant device operable within the interior region of the frame and operable to be supported by the base, the compliant device operable to receive and support a microsection sample, the compliant device operable to bias a microsection sample against the at least one leveling portion of the frame to stabilize and align the microsection sample, such that an examination plane surface of the microsection sample is viewable through the viewing window;
    wherein the compliant device comprises a bladder operable to be filled with a fluid to bias the microsection sample against the at least one leveling portion in response to operation of a fluid control system coupled to the bladder.

13. A microsection sample stabilizer for use with a microscope, comprising:
    a frame comprising a base and at least one leveling portion supported by the base, the at least one leveling portion defining a viewing window;
    an interior region within the frame, defined by the base and the at least one leveling portion, the viewing window in open communication with the interior region;
    at least one compliant device operable within the interior region of the frame and operable to be supported by the base, the compliant device operable to receive and support a microsection sample, the compliant device operable to bias a microsection sample against the at least one leveling portion of the frame to stabilize and align the microsection sample, such that an examination plane surface of the microsection sample is viewable through the viewing window; and one or more position adjustment devices supported by at least one of the first or second leveling portions, wherein the one or more position adjustment devices are operable to adjust a position of the microsection sample when supported by the microsection sample stabilizer.

14. A microsection sample stabilizer for use with a microscope, comprising:
   a frame comprising a base and at least one leveling portion supported by the base, the at least one leveling portion defining a viewing window;
   an interior region within the frame, defined by the base and the at least one leveling portion, the viewing window in open communication with the interior region; and
   at least one compliant device operable within the interior region of the frame and operable to be supported by the base, the compliant device operable to receive and support a microsection sample, the compliant device operable to bias a microsection sample against the at least one leveling portion of the frame to stabilize and align the microsection sample, such that an examination plane surface of the microsection sample is viewable through the viewing window;
   wherein the at least one leveling portion is pivotally coupled to the base, and movable between open and closed positions, such that the compliant device and the microsection sample are insertable into the interior region when the at least one leveling portion is in the open position.

15. A microsection sample stabilizer for use with a microscope, comprising:
   a frame comprising a base and at least one leveling portion supported by the base, the at least one leveling portion defining a viewing window;
   an interior region within the frame, defined by the base and the at least one leveling portion, the viewing window in open communication with the interior region; and
   at least one compliant device operable within the interior region of the frame and operable to be supported by the base, the compliant device operable to receive and support a microsection sample, the compliant device operable to bias a microsection sample against the at least one leveling portion of the frame to stabilize and align the microsection sample, such that an examination plane surface of the microsection sample is viewable through the viewing window,
   wherein the compliant device comprises a compressible elastic body formed from at least one of rubber, elastomer, polyester foam, or polyurethane foam and operable to apply a biasing force to bias the microsection sample against the at least one leveling portion when compressed.

* * * * *